United States Patent Office 3,169,988
Patented Feb. 16, 1965

3,169,988
PREPARATION OF SCHIFF BASES
John P. Luvisi, Park Ridge, Ill., assignor to Universal Oil Products Company, Des Plaines, Ill., a corporation of Delaware
No Drawing. Filed Aug. 16, 1961, Ser. No. 131,737
5 Claims. (Cl. 260—566)

This invention relates to a novel process for the preparation of Schiff bases. In particular, this invention relates to the reaction of a organic nitro compound and an alkyl aromatic compound and the resulting Schiff base reaction product.

Schiff bases are generally defined in the art as a series of products resulting from the condensation of aldehydes or ketones with primary amines, particularly the condensation of aliphatic aldehydes and aromatic amines. The products thus obtained find extensive application in industry, in some cases as accelerators for the vulcanization of rubber and in other cases as intermediates in the manufacture of dyes, for example, phenylene blue, toluene blue, naphthol blue, and the like. The products are also useful as organic intermediates in the preparation of many organic compounds and also as sequestering agents for inhibiting the undesirable effects of trace metal ions in mineral oils and gasoline.

It is an object of this invention to present a novel process for the preparation of products generally referred to as Schiff bases. It is a further object to present a novel reaction which comprises reacting an organic nitro compound with an alkyl aromatic compound wherein the reaction products are Schiff bases.

It is contemplated that in many instances the present invention will provide a more direct route to a desired product than is available by conventional methods. For example, aniline can be condensed with benzaldehyde to yield N-benzal aniline by conventional methods, the aniline being available through the reduction of nitrobenzene and the benzaldehyde being available through the oxidation of toluene. On the other hand nitrobenzene and toluene can be reacted directly by the present process to yield the desired N-benzal aniline.

In one of its broader aspects the present invention embodies a process for reacting an organic nitro compound with an alkyl aromatic compound which comprises contacting said organic nitro compound, said alkyl aromatic compound, and a free radical generating compound at a temperature effecting the decomposition of said free radical generating compound and recovering the resulting reaction product.

Another embodiment is in a process for reacting a nitro aromatic compound with an alkyl aromatic hydrocarbon which comprises contacting said nitro aromatic compound, said alkyl aromatic hydrocarbon, and an organic peroxide at a temperature of from about 50° C. to about 300° C. and recovering the resulting reaction product.

Still another embodiment is in a process for reacting a nitro paraffinic aliphatic compound with an alkyl aromatic hydrocarbon which comprises contacting said nitro paraffinic aliphatic compound, said alkyl aromatic hydrocarbon, and an organic peroxide at a temperature of from about 50° C. to about 300° C. and recovering the resulting reaction product.

A further embodiment is in a process for reacting a nitro aromatic compound with an alkyl benzene which comprises contacting said nitro aromatic compound, said alkyl benzene, and t-butyl peroxide at a temperature of from about 130° C. to about 300° C. and recovering the resulting reaction product.

Another embodiment is in a process for reacting a nitro paraffinic aliphatic compound with an alkyl benzene which comprises contacting said nitro paraffinic aliphatic compound, said alkyl benzene, and t-butyl peroxide at a temperature of from about 130° C. to about 300° C. and recovering the resulting reaction product.

One specific embodiment is in a process for reacting o-chloronitrobenzene with toluene which comprises contacting said o-chloronitrobenzene, toluene, and t-butyl peroxide at a temperature of from about 130° C. to about 300° C. and recovering the resulting o-chloro-(N-benzal)-aniline.

Further embodiments and advantages of the process of the present invention will become apparent in the following detailed description thereof.

In accordance with the process of this invention an organic nitro compound is reacted with an alkyl aromatic compound. Organic nitro compounds include nitro aromatic compounds such as nitrobenzene,
o-dinitrobenzene,
m-dinitrobenzene,
p-dinitrobenzene,
1,2,3-trinitrobenzene,
1,2,4-trinitrobenzene,
1,3,5-trinitrobenzene,
1-nitronaphthalene,
2-nitronaphthalene,
1,3-dinitronaphthalene,
1,5-dinitronaphthalene,
1,8-dinitronaphthalene, etc., and substituted nitro aromatic compounds like o-chloronitrobenzene,
m-chloronitrobenzene,
p-chloronitrobenzene,
o-fluoronitrobenzene,
m-fluoronitrobenzene,
p-fluoronitrobenzene,
o-bromonitrobenzene,
m-bromonitrobenzene,
p-bromonitrobenzene,
o-iodonitrobenzene,
m-iodonitrobenzene,
p-iodonitrobenzene,
o-nitrophenol,
m-nitrophenol,
p-nitrophenol,
o-nitrotoluene,
m-nitrotoluene,
p-nitrotoluene,
o-nitroethylbenzene,
m-nitroethylbenzene,
p-nitroethylbenzene, and the like. The organic nitro compounds of this invention also include aliphatic nitro compounds, for example, 2-nitropropene,
2-nitro-2-butene,
2-nitro-1-butene,
2-nitro-2-pentene,
2-nitro-2-hexene,
3-nitro-3-hexene,
1-phenyl-2-nitro-1-propene,
1-phenyl-2-nitro-2-butene,
1-phenyl-2-nitro-1-butene,
1-phenyl-2-nitro-1-pentene,
4-phenyl-2-nitro-2-pentene,
1-phenyl-3-nitro-2-hexene, etc., and particularly paraffinic aliphatic nitro compounds including nitromethane,
nitroethane,
1-nitropropane,
2-nitropropane,
1,1-dinitroethane,
2-methyl-1-nitropropane,
1-nitrobutane,
2-nitrobutane,
1-nitropentane,
2-nitropentane,
nitrohexane,
nitroheptane, etc., and also substituted derivatives of said nitro aliphatic compounds including 2-nitro-1-propanol,
2-methyl-2-nitro-1-propanol,
2-nitro-1-butanol,
2-methyl-2-nitro-1-butanol,
2-ethyl-2-nitro-1-butanol,
2-methyl-2-nitro-1,3-propanediol,
2-ethyl-2-nitro-1,3-propanediol, etc.

Paraffinic as well as olefinic alicyclic nitro compounds are also operable according to the process of the present invention, for example nitrocyclopentane, nitrocyclopentene, and the like.

Alkyl aromatic compounds which are operable according to the present process include alkyl aromatic hydrocarbons, for example, toluene, ethylbenzene, propylbenzene, butylbenzene, pentylbenzene, o-xylene, m-xylene, p-xylene, o-ethyltoluene, m-ethyltoluene, p-ethyltoluene, o-propyltoluene, m-propyltoluene, p-propyltoluene, 1,2,3-trimethylbenzene, 1,2,4-trimethylbenzene, 1,3,5-trimethylbenzene, as well as condensed ring alkyl aromatic hydrocarbons such as 1-methylnaphthalene, 2-methylnaphthalene, 1-ethylnaphthalene, 2-ethylnaphthalene, etc. Substituted alkyl aromatic hydrocarbons are also operable and include, for example, o-chlorotoluene, m-chlorotoluene, p-chlorotoluene, o-fluorotoluene, m-fluorotoluene, p-fluorotoluene, o-bromotoluene, m-bromotoluene, p-bromotoluene, o-iodotoluene, m-iodotoluene, p-iodotoluene, o-cresol, m-cresol, p-cresol, 2,3-dihydroxytoluene, 2,4-dihydroxytoluene, 2,5-dihydroxytoluene, 2,6-dihydroxytoluene, 3,5-dihydroxytoluene, etc.

In one preferred embodiment of this invention o-chloronitrobenzene is reacted with toluene to form o-chloro-(N-benzal)-aniline.

In another preferred embodiment p-nitrophenol is reacted with toluene to form p-hydroxy-(N-benzal)-aniline.

In still another preferred embodiment of this invention p-dinitrobenzene is reacted with toluene to form N,N'-di-benzal-p-phenylenediamine.

p-Chloronitrobenzene is reacted with p-xylene in another preferred embodiment to yield N,N'-terephthalal-di-p-chloroaniline.

Another preferred embodiment relates to the reaction of 2-nitropropane and p-xylene to form N,N-terephthalal-di-isopropylamine.

The organic nitro compound is reacted with the alkyl aromatic compound by contacting said organic nitro compound, said alkyl aromatic compound, and a free radical generating compound at reaction conditions hereinafter set forth. Suitable free radical generating compounds include diazonium compounds, metal alkyls, and peroxy compounds. Peroxy compounds containing the bivalent radical -o-o- decompose to form free radicals in the manner herein contemplated and are a preferred class of free radical generating compounds. Suitable peroxy compounds include the persulfates, perborates, and the percarbonates of the ammonium and of the alkali metals; peracetic acid, dimethyl peroxide, diethyl peroxide, di-t-butyl peroxide, di-propyl peroxide, acetyl peroxide, benzoyl peroxide, propionyl peroxide, butyryl peroxide, lauroyl peroxide, 2,4-dichlorobenzoyl peroxide, tetralin peroxide, urea peroxide, t-butyl perbenzoate, t-butyl hydroperoxide, methylcyclohexyl hydroperoxide, cumene hydroperoxide, diisopropylbenzene hydroperoxide, paramenthane hydroperoxide, methylethylketone peroxide, cyclohexanone peroxide, isopropyl percarbonate, etc. The organic peroxy compounds constitute a preferred class of compounds for use in this invention, of these, the dialkyl and the diacyl peroxides are particularly preferred.

The organic nitro compound, alkyl aromatic compound, and the free radical generating compound are contacted at a temperature effecting the decomposition of said free radical generating compound. Free radical generating compounds such as peroxy compounds, particularly organic peroxides, decompose at a measurable rate with time in logarithmetic function dependent on temperature. The rate of decomposition can be, and ordinarily is, expressed as the half life of a peroxide at a particular temperature. For example, the half life in hours of di-t-butyl peroxide is 17.5 hours at 125° C., 5.3 hours at 135° C., and 1.7 hours at 145° C. (calculated from data for the first 33% decomposition). A reaction temperature must be selected whereby the free radical generating compound decomposes at a rate somewhat commensurate with the rate at which the organic nitro compound and the alkyl aromatic compound react. This is desirable in that free radicals generated at too rapid a rate would tend to yield undesirable by-products. When the half life of the free radical generating compound is greater than 10 hours, radicals are not generated at a rate sufficient to cause the reaction of the process of this invention to proceed at a detectable rate. The reaction temperature may be from about 50° C. to about 300° C., and at least as high as the decomposition temperature of the free radical generating compound, by which is meant a temperature such that the half life of the free radical generating compound is not greater than 10 hours. Since the half life for each free radical generating compound is different at different temperatures, the exact temperature to be utilized in a particular reaction will vary. However persons skilled in the art are well acquainted with the half life vs. temperature data for different free radical generating compounds and thus it is within the skill of one familiar with the art to select the particular temperature needed in any particular case. Generally the operating temperature should not exceed the temperature at which the half life is less than 10 hours by substantially more than about 150° C. since free radical generating compounds decompose rapidly under such conditions. The half life of t-butyl perbenzoate is less than 10 hours at about 110° C. and accordingly, when this peroxy compound is used, the reaction temperature is from about 110° C. to about 300° C. but generally not greater than about 265° C. A reaction temperature of from about 130° C. to about 300° C. is suitable when the free radical generating compound is di-t-butyl peroxide, and from about 75° C. to about 300° C., but generally not greater than about 225° C. with benzoyl peroxide.

The reaction conditions utilized in the present process relate principally to temperature. Although it may be desirable to employ superatmospheric pressures of up to about 100 atmospheres, for example, to maintain the reactants in a liquid phase, pressure is not considered to be an important variable in the process of this invention and may be simply autogenous pressure developed during the course of the reaction. The mechanics of the present reaction have not been fully ascertained at this time. Although the free radical generating compound is not a reactant in the sense that it reacts with the organic nitro compound and the alkyl aromatic compound to form the desired product, nevertheless said free radical generating compound should be present in at least stoichiometric amounts with relation to the organic nitro compound to achieve optimum results. The alkyl aromatic compound is preferably present in excess of stoichiometric amounts.

The process of this invention may be carried out in a batch or a continuous type of operation. In a batch type of operation the process may be carried out on a small scale in a reaction vessel comprising conventional laboratory glassware or glass lined equipment. Larger scale operations are preferably carried out in a more substantial reaction vessel such as a steel autoclave which may or may not be glass lined. In either case the reaction vessel should incorporate a heating means and a suitable mixing means which may be a mechanical stirring device or a device for agitating the reaction vessel itself as in the case of a rotating or a rocking autoclave. The reactants are charged to the reaction vessel and heated therein at a pre-determined reaction temperature. After a suitable reaction period has elapsed the vessel contents are cooled and the product recovered therefrom by conventional distillation methods.

The preferred method of operation is a continuous type. In this method of operation the organic nitro compound, alkyl aromatic compound, and the free radical generating compound are charged in separate streams or in a single combined stream, to a reactor containing therein a reaction zone maintained at the proper reaction conditions. The reactor may be an unpacked vessel or coil, or it may contain an adsorbent packing material such as fire brick, alumina, dehydrated bauxite, and the like. The products are recovered from the reactor effluent by conventional means, such as by fractionation, and the unreacted materials which are recovered may be recycled.

The following examples are presented to further illustrate the process of this invention and it is not intended to thereby unduly limit the generally broad scope thereof.

*Example I* o-Chloro-(N-benzal)-aniline was prepared by charging 31 g. (0.2 mole) of o-nitrochlorobenzene, 150 g. (1.6 moles) of toluene, and 29 g. (0.2 mole) of di-t-butyl peroxide to an 850 cc. capacity glass lined steel autoclave. The autoclave contents were sealed in under 30 atm. initial nitrogen pressure and the autoclave rotated for about a three hour period at a temperature of 130–140° C. The reaction mixture was cooled and o-chloro-(N-benzal)-aniline recovered therefrom by fractional distillation. The product had a boiling point of about 345° C. Elemental analysis: found, C, 72.65; H, 5.10; N, 6.96; Cl, 16.05, as compared with C, 72.39; H, 5.01; N, 6.49; Cl, 16.43 calculated for o-chloro-(N-benzal) aniline.

*Example II* p-Hydroxy-(N-benzal)-aniline is prepared by charging about 28 g. of o-nitrophenol, 150 g. of toluene, and 29 g. of di-t-butyl peroxide to a glass lined 850 cc. steel autoclave under an initial pressure of about 30 atm. of nitrogen. The autoclave is rotated and the contents heated at 130–140° C. for about a three hour period. p-Hydroxy-(N-benzal)-aniline is recovered from the reaction mixture by fractional distillation, preferably at reduced pressure.

*Example III*

N,N'-di-benzal-p-phenylenediamine is prepared by charging about 34 g. of p-dinitrobenzene, 300 g. of toluene, and 58 g. of di-t-butyl peroxide to a glass lined 850 cc. steel autoclave under an initial pressure of about 30 atmospheres of nitrogen. The autoclave is rotated and the contents heated therein at a temperature of 130–140° C. for about a 3 hour period. N,N'-di-benzal-p-phenylenediamine is recovered from the reaction mixture by fractional distillation, preferably at reduced pressure.

*Example IV*

N,N'-terephthalal-di-p-chloroaniline is prepared by charging about 62 g. p-chloronitrobenzene, 170 g. of toluene, and 58 g. of di-t-butyl peroxide to a glass lined 850 cc. steel autoclave under an initial pressure of about 30 atmospheres of nitrogen. The autoclave is rotated and the contents heated at a temperature of about 130–140° C. for about a 3 hour period. N,N'-terephthalal-di-p-chloroaniline is recovered from a reaction mixture by fractional distillation, preferably at reduced pressure.

*Example V*

N,N'-terephthalal-di-isopropylamine is prepared by charging about 36 g. of 2-nitropropane, 170 g. of p-xylene, and 58 g. of di-t-butyl peroxide to a glass lined 850 cc. steel autoclave under an initial pressure of about 30 atms. of nitrogen. Autoclave is rotated and the contents heated at a temperature of about 130–140° C. for about a 3 hour period. N,N'-terephthalal-di-isopropylamine is recovered from the reaction mixture by fractional distillation, preferably at reduced pressure.

*Example VI* p-Chloro-(N-benzal)-aniline was prepared by charging 31 g. (0.2 mole) of p-nitrochlorobenzene, 150 g. (1.6 mole) toluene, and 29 g. (0.2 mole) of di-t-butyl peroxide to an 850 cc. capacity glass lined steel autoclave. The autoclave contents were sealed in under 30 atmospheres initial nitrogen pressure and the autoclave rotated for about a three hour period at a temperature of 130–140° C. The reaction mixture was cooled and p-chloro-(n-benzal)-aniline recovered therefrom by fractional distillation.

I claim:
1. A process for reacting o-chloronitrobenzene with toluene which comprises contacting said o-chloronitrobenzene, toluene, and t-butyl peroxide in at least a stoichiometric amount in relation to the nitro benzene at a temperature of from about 130° C. to about 300° C. and recovering the resulting o-chloro-(N-benzal)-aniline.

2. A process for reacting p-nitrophenol with toluene which comprises contacting said p-nitrophenol, toluene, and t-butyl peroxide in at least a stoichiometric amount in relation to the p-nitrophenol at a temperature of from about 130° C. to about 300° C. and recovering the resulting p-hydroxy-(N-benzal)-aniline.

3. A process for reacting p-dinitrobenzene with toluene which comprises contacting said p-dinitrobenzene, toluene, and t-butyl peroxide in at least a stoichiometric amount in relation to the nitro benzene at a temperature of from about 130° C. to about 300° C. and recovering the resulting N,N'-di-benzal-p-phenylenediamine.

4. A process for reacting p-chloronitrobenzene with p-xylene which comprises contacting said p-chloronitrobenzene, p-xylene, and t-butyl peroxide in at least a stoichiometric amount in relation to the nitro benzene at a temperature of from about 130° C. to abut 300° C. and recovering the resulting N,N'-terephthalal-di-p-chloroaniline.

5. A process for reacting 2-nitropropane with p-xylene which comprises contacting said 2-nitro-propane, p-xylene, and t-butyl peroxide in at least a stoichiometric amount in relation to the 2-nitro-propane at a temperature of from about 130° C. to about 300° C. and recovering the resulting N,N'-terephthalal-di-isopropylamine.

References Cited in the file of this patent

Jackson et al.: J. Chem. Soc. (London), volume of 1960, pp. 1653–1657.